Figure 1:
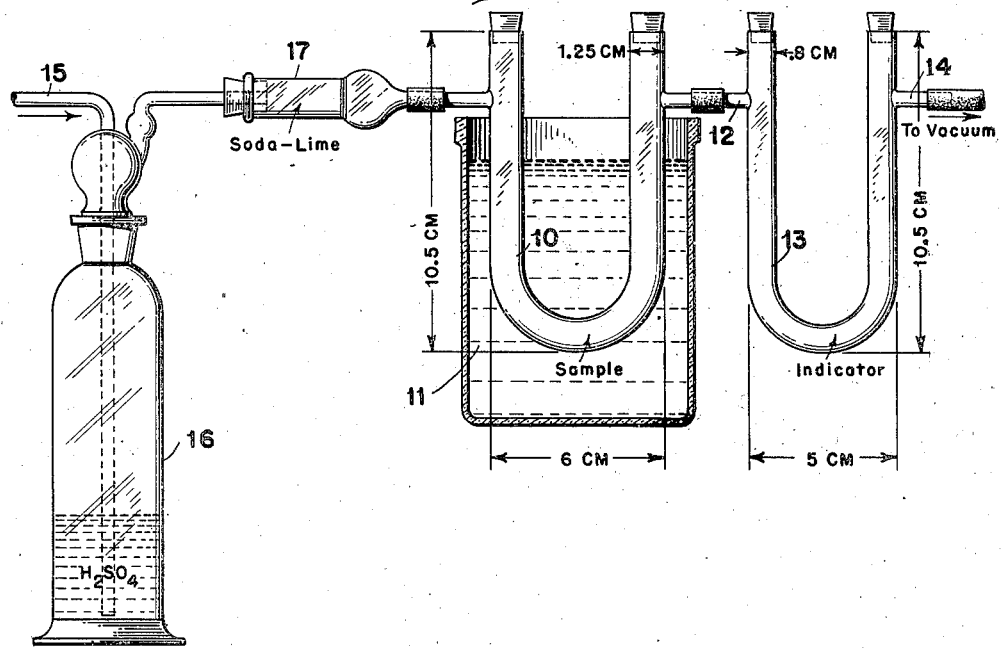

July 30, 1946.  R. E. REEVES ET AL  2,404,887
STABILIZATION OF NITROCELLULOSE
Filed May 5, 1944

Inventors
R. E. REEVES
J. E. GIDDENS

Attorney

Patented July 30, 1946

2,404,887

UNITED STATES PATENT OFFICE 2,404,887

STABILIZATION OF NITROCELLULOSE

Richard E. Reeves and Joel E. Giddens, New Orleans, La., assignors to United States of America as represented by Claude R. Wickard, Secretary of Agriculture, and his successors in office Application May 5, 1944, Serial No. 534,370

2 Claims. (Cl. 260—223)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to nitrated cellulose, and has for its primary objects an improvement in the process of stabilizing such cellulose, and such other objects as will be apparent in consideration of the following specification:

Due to the use of sulfuric acid in the preparation of nitrocellulose, it is ordinarily necessary to remove the retained sulfate to stabilize the product. This is conventionally accomplished by repeated boiling in water and beating treatments, a long and tedious process. It is also known that addition of a little ammonia to the boiling water aids in stabilization. However, in this event it is necessary to control the amount of ammonia added very closely, as the addition of ammonia little beyond slight alkalinity deleteriously affects the nitrocellulose.

According to this invention, ammonia is used at a lower temperature, preferably room temperature, as one treatment, in which event the alkalinity need not be so carefully controlled. Also, ammonium salts may be used instead of the hydroxide, and if the treating solution is buffered to remain slightly acidic, excess salt can be used with a hot solution with no deleterious effect on the nitrocellulose, and thus be introduced in connection with a boiling treatment as claimed in copending application, Serial No. 670,086, filed May 16, 1946.

Preferably, the ammonia treatment is combined with at least a prior boil, and boiling and beating treatments may be advantageously employed subsequent to the boil but prior to the ammonia treatment.

Room temperatures are most satisfactory for the ammonia treatment because of convenience, although higher and lower temperatures are effective. In general, it may be said, however, that the higher the temperature the more closely the alkalinity must be controlled.

The process has been carried out principally using cut cotton as the cellulosic raw material, but has been found to be equally effective with cotton linters, and is also effective with nitrocellulose derived from wood pulp.

The process is more specifically exhibited in following examples:

EXAMPLE I

Cotton fibers, cut to about 0.15 inch and purified to meet the specifications for linters to be used in the production of "pyro" nitrocellulose by the Naval Powder Factory, were dried overnight at 105° C. A 32 g. portion of the dried fiber was stirred in a solution consisting of 234 g. of $H_2O$, 866 g. of $H_2SO_4$, and 494 g. of $HNO_3$, all chemicals used being of C. P. or reagent grade. The mixture was maintained at 40° C. for 20 minutes, immediately after which the formed nitrocellulose was filtered and drowned in cold tap water. It was then washed with 10 changes of water, and was boiled for 4 hours under reflux and dried, giving a lot having a nitrogen content of 12.76%.

The boiled nitrocellulose, as above obtained, was divided in four parts, one of which was rinsed and dried and kept as a control sample. The other three parts were separately stirred for 15 minutes, each with 50 parts of ammonium hydroxide solution containing 0.05%, 0.20% and 1.00% of ammonia, respectively, at room temperatures, to obtain three separate stabilized samples. The excess ammonium hydroxide was removed and the samples washed and dried.

Tests were run on these samples against the control sample using the known 134.5° heat test (Military explosives, War Department Technical Manual 9–2900, August 29, 1940, pp. 66 and 67), and also using a second procedure hereinafter designated as the "110° test." This second procedure was developed especially to handle small samples with safety and reproducibility, and is illustrated by the apparatus shown in Figure 1 of the drawing. In this apparatus, a suitable quantity (0.5 g. with an apparatus having dimensions as shown in the drawing) of the sample to be tested is placed in a U-tube 10 immersed in a tricresyl phosphate bath 11 maintained at 110°±0.5° C. The U-tube 10 is stoppered at its upper ends, and has one of its legs connected by a tube 12 to one leg of a second U-tube 13. An indicator consisting of 1 ml. of an aqueous solution of 0.5% potassium iodate, 1.0% potassium iodide, and 3 drops of a 2% starch solution is placed in the second U-tube 13. This U-tube is also stoppered at its upper ends, and its other leg is connected through a tube 14 to a suitable suction device (not shown). Outside air is drawn from a tube 15 at the rate of 30 ml. per minute through sulfuric acid in flask 16, thence through soda line in bulb 17, thence passing through U-tube 10, sweeping through the sample therein, and thence passing through tube 13, bubbling through the indicator therein. The air sweeps the volatile decomposition products from the sample, the end of the test being determined when blue coloration develops in the indicator. The time required for this coloration to occur is taken as a measure of the stability of the sample tested.

With the 110° test, as above described, the stability of highly unstable nitrocellulose samples may be evaluated with comparative safety and the reproducibility with such samples is excellent. Moisture control of the sample is not such a critical factor as in the case of those tests which keep evolved gases in contact with the heated sample, and therefore the 110° test may be used with air-dried samples.

The 110° test and the 134.5° heat test often yield approximately the same times for a given sample. In both tests samples showing times of less than 10 minutes may be classified as having poor stability, those showing from 10 minutes to 25 minutes as having moderate stability, and those showing more than 25 minutes as having good stability.

The following table indicates results of the tests of the control and the three samples of Example I, the several results indicated from each test of a sample being obtained by repeated tests on the same sample.

*Table 1*

| Treatment | 134.5° heat test, minutes | 110° test, minutes |
| --- | --- | --- |
| Control | 7 | 3, 4 |
| 0.05% NH₃ | 32, 29 | 80, 52, 64 |
| 0.20% NH₃ | 30, 30 | 49, 69, 35 |
| 1.00% NH₃ | 37, 35 | 102, 100, 72, 60 |

In order to determine whether the stabilizing effect of the ammonia treatment is due to the alkality of the ammonia, experiments were conducted on similar samples of freshly prepared nitrocellulose using dilute aqueous solutions of other basic substances such as lithium carbonate, sodium hydroxide, methylamine, etholamine, pyridine, and urea. The stabilizing effects of these were nil. Apparently, therefore, the stabilizing action of ammonia is not due to its alkalinity, or at least due to this alone, but involves other properties.

As illustrated by the following example, improvement in stability is obtained by combining the ammonia treatment with a variety of boiling and beating treatments.

EXAMPLE II

A 64 g. batch of cut cotton was nitrated in a manner similar to that employed in Example I, giving a lot having a nitrogen content of 12.66%. All boiling and beating treatments were made in distilled water and with a Waring blender. At various stages of the boiling, with or without beating, samples were removed and each removed sample was divided into two parts. One part was rinsed and dried and used as the control to indicate stability derived from the boiling and beating treatment, the other part being stirred for 15 minutes at room temperature in 1% aqueous ammonia following the boiling and beating treatments, rinsed and dried.

In the boiling and beating treatment, the water was changed at the end of 4, 16, 28, 40, 50, 63 and 70 hours.

Test results on the removed samples are given in the following table, the asterisks in the table indicating that the samples were too unstable to be tested by the procedure employed, and the blanks indicating that no test was conducted in the particular instances.

*Table 2*

| Boiling and beating treatment | 134.5° heat test | | 110° test | |
| --- | --- | --- | --- | --- |
| | Control part, minutes | Ammonia treated part, minutes | Control part, minutes | Ammonia treated part, minutes |
| None | * | 20, 20 | 2, 2 | 18, 25 |
| Boiled 2 hrs | * | | 4, 4 | 29, 18 |
| Boiled 4 hrs | * | 25, 25 | 4, 5 | 35, 30 |
| Boiled 14 hrs | * | 26, 26 | 4, 5 | 25, 25 |
| Boiled 20 hrs | | | 5, 5 | 27, 31 |
| Boiled 30 hrs | | | 8, 7 | 32, 26 |
| Boiled 40 hrs | 15, 17 | 32, 37 | 7, 7 | 23, 17 |
| Boiled 40 hrs. and beaten | 26, 24 | 23, 23 | 27, 23 | 15, 23, 20 |
| Boiled 50 hrs. (beaten at 40 hrs.) | | 23 | | 16, 22 |
| Boiled 63 hrs. and beaten (2d time) | 27, 29 | 40, 40 | 20, 23 | 32, 30 |
| Boiled 70 hrs. (beaten at 40 and 63 hrs.) | 24, 24 | 24, 24 | 16, 14 | 23, 23 |

Comparison of results given in the data of Table 2 shows that ammonia treatment produces a greater change in stability in the earlier stage of the boiling and beating treatments than in the later stages. A product of high stability is obtained if ammonia is used with only 4 hours prior boil, whereas without the use of ammonia a 40-hour boil is required to give a corresponding degree of stability.

In the examples given above, the ammonia treatment was effected by using dilute aqueous ammonium hydroxide as the stabilizing agent. However, other ammonium agents, such as ammonium sulfate, may be used. For example, freshly prepared nitrocellulose may be boiled with a slightly acid solution containing ammonium salts buffered to remain at a pH higher than 3.5, preferably higher than 4, with excellent stabilizing results. In this case, the concentration of ammonium salts in the solution may be as low as 0.10%, calculated as ammonium sulfate. The buffering agent may be any which will give a satisfactory buffering action in the faintly acid region. Sodium acetate, potassium acid phthalate, and sodium citrate have been found satisfactory. One hour boiling in such a solution gives a nitrocellulose of excellent stability.

Cut cotton fibers were used in the preceding examples. The treatment with cotton linters gives similar stabilization results, as illustrated in the following example:

EXAMPLE III

A batch of nitrocellulose prepared from cotton linters and having a nitrogen content of 12.73% was divided into two parts. One part was boiled for 4 hours without ammonia treatment and the other was placed in water, adjusted to slight alkalinity with ammonium hydroxide, and stirred for 1 hour at room temperature.

Test results on the two parts are shown in Table 3.

Table 3

| Treatment | 134.5° heat test | 110° test |
|---|---|---|
| Stirred 1 hour in dilute NH₃ | 20 | 30, 36 |
| Boiled 4 hours, no NH₃ | | 3, 3 |

As before stated, the action of the ammonia is not due alone to its alkalinity, as has been amply demonstrated by substitution of other bases. Although the true action is not definitely known, it may be stated that it is probably due to an ability of the ammonia to penetrate the structure of the nitrocellulose fiber and neutralize the sulfate bound within the fiber structure or within the molecules themselves. Experiments relative to sulfate contents and consumed ammonia content tend to exhibit this. Such experiments also indicate the consumption of ammonia in the process and optimum conditions relative to other factors, and they give an indication of the nature of the sulfate association with the nitrocellulose structure.

Quantitative analyses of sulfate and ammonia in nitrocellulose present numerous difficulties. The amounts of sulfate to be determined lie between 0.1 mg. and 8.0 mg. SO₄ per g. of nitrocellulose, and the ammonia contents vary between 0.03 mg. and 2.0 mg. NH₃ per g. The analyses which involve the destruction of the nitrocellulose by chemical digestion are not trustworthy under these conditions, as they introduce complicating factors obscuring the desired results when dealing with such small percentages of sulfate and ammonia.

A substitute procedure involving mechanical separation of the sulfate and ammonia was used, therefore, in which comparatively large samples are given repeated boiling in pure water or in a dilute aqueous solution of HCl and beating treatments. In this manner, extracts are obtained which contain a minimum of interfering decomposition products from the cellulose nitrate. By using suitably large samples and by concentrating the extracts, it is possible to analyze for the very small traces of sulfate and ammonia removed from the nitrocellulose which probably escape detection in the usual methods of analysis.

The vigorous beating action desired in this method of analysis is well obtained by use of a Waring blender.

For analysis of the sulfate, 58 hours boiling with eight changes of approximately 100 parts of distilled water or of a 0.01 normal HCl solution of the sample per part, may be employed, followed by one beating. The several filtered extracts may then be combined for sulfate determination or each may be investigated separately and the amounts totaled for determination of the total sulfate content. Determination of the extracted sulfate is readily accomplished by the turbidimetric method of Treon and Crutchfield (Ind. Eng. Chem., anal. (1942) ed. 14, p. 119) modified to allow for use of smaller volumes of solutions. With a 25 ml. volume, amounts of SO₄ between 0.1 mg. and 2.0 mg. may be determined with considerable accuracy. Observations may be made in a Coleman Model 11 Spectrophotometer at a wave length of 540 mu and the values read from a standard curve established with known solutions of sulfuric acid.

In determining the ammonia content of the nitrocellulose, essentially the same procedure of extraction may be followed as in analysis for the sulfate. In this case, it is better to use the 0.01 normal HCl solution for the boiling. The removed ammonia may then be determined by use of Nessler's reagent (see formula of Bock and Benedict, as given by Hawk and Bergeim, Practical Physiological Chemistry (1937), 11th ed., Blakiston, Philadelphia, Pennsylvania, p. 928) and the blank and test samples compared with the Coleman Spectrophotometer at 425 mu, the quantity of ammonia being read from a standard curve established with known solutions of ammonium chloride.

By using the 0.01 normal HCl solution for boiling, both the sulfate and ammonia determinations may be made simultaneously on the same sample.

In analysis for the ammonia according to the above-outlined procedure, it has been found that repeated boiling with changes of solution does not show the amount of ammonia removed in successive extracts to approach zero, as would be expected. Rather, the readings approach a minimum of approximately 0.03 mg. NH₃ per g. of nitrocellulose. This minimum is usually reached after four boiling treatments.

Testing the analysis on 70 treatments with boiling and beating, using many samples of nitrocellulose which had not been exposed to an ammonia treatment and were presumably free from ammonia, showed an average of 0.034 mg. NH₃ (or at least a substance which reacted with Nessler's reagent), per g. of nitrocellulose. Therefore, it has been concluded that the observed minimum of approximately 0.03 mg. NH₃ per g. of nitrocellulose is a systematic error in the procedure and all values are adjusted by subtracting 0.034 from the observed value in each separate reading.

It has also been found that the vigorous beating given the nitrocellulose in the above-described manner of mechanical separation of the sulfate, quickly liberates the sulfate even from samples which had been subjected to long boiling, and that a short period of beating (5 minutes) is accompanied by an increase in stability of the nitrocellulose, provided the nitrocellulose has already been extensively boiled. However, continued beating introduces unstability. Therefore, it appears that the beating results in two competing factors: first, stabilizing due to separation of the sulfate from the nitrocellulose, accomplished in a short period; and second, a harmful effect probably due to some action of the beater on the nitrocellulose itself, introducing unstability in the longer periods of beating. For this reason, unless otherwise noted, all described beating periods are for 5 minutes.

By using the extraction method of analysis for the sulfate and by testing the nitrocellulose for stability at various stages in the extracting process, precise information on the effect of sulfate on stability was obtained. As representative, a 20 g. sample of nitrocellulose (13.0% N) was boiled with changes of distilled water, beating treatments being introduced at intervals, and the several extracts were analyzed for SO₄, the process being continued until a negligible amount of SO₄ was removed in the final treatments. By computing the amount of sulfate removed in each extract per gram of sample and adding the results, the total sulfate content of the original sample was obtained. Also, the sulfate content of the sample at the beginning of any stage of removal was similarly determined by adding the SO₄ determinations of the extracts including that stage and those following. Table 4 indicates the results of one such experiment.

Table 4

| Treatment | Total boil, hours | Total sulfate (SO₄) in sample at end of treatment, mg./g. | Stability 110° test, minutes |
|---|---|---|---|
| Rinsed | 0 | 4.05 | |
| Boiled 2 hrs | 2 | 2.39 | 3 |
| Boiled 5 hrs | 7 | 1.61 | 3 |
| Boiled 16 hrs | 23 | 0.84 | 4 |
| Boiled 8½ hrs | 31 | 0.59 | 5 |
| Boiled 15½ hrs | 46 | 0.43 | 7 |
| Beaten 10 min | | 0.26 | 12 |
| Boiled 7 hrs | 53 | 0.20 | 15 |
| Boiled 7 hrs | 60 | 0.16 | 29, 30 |
| Beaten 10 min | | 0.15 | 18, 20 |
| Boiled 16 hrs | 76 | 0.13 | 16 |
| Boiled 5 hrs | 81 | 0.11 | |
| Boiled 16 hrs | 97 | 0.10 | 20, 20 |
| Boiled 58 hrs. with 8 changes of water and beaten 5 min | 155 | 0.00 | |

Figure 2:
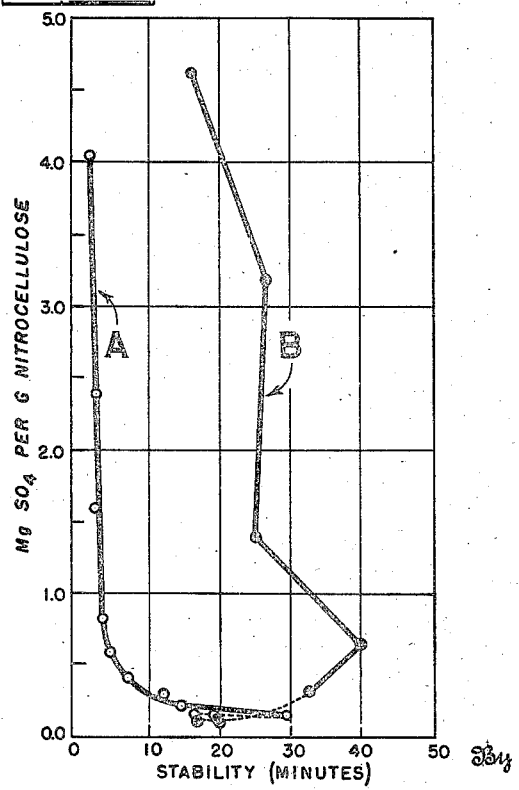

The relationship of sulfate content and stability is more easily visualized by reference to curve A shown in Figure 2 of the drawing, in which the ordinate represents SO₄ content in mg. per g. of nitrocellulose, and the abscissa represents stability as determined by the 110° test, the curve indicating less stability after the 30-minute point, since unstability beyond that point is introduced due to the beating treatment.

Curve A of Figure 2 indicates that stability is a function of SO₄ content, provided other factors, such as excessive beating, are not introduced which tend to alter the stability.

If ammonia treatment is given, the stability results are entirely different, as indicated in Table 5 showing tests on a number of samples of nitrocellulose having different SO₄ contents, and treated for 15 minutes at room temperature with a 1% ammonia solution.

Table 5

| Previous treatment of samples | SO content of samples, mg./g. | 1% ammonia treatment stability 110° test, minutes |
|---|---|---|
| Rinsed free of acids | 4.64 | 14, 15, 18 |
| Boiled 30 min | 3.20 | 24, 28 |
| Boiled 2 hrs | 1.40 | 25, 25 |
| Boiled 8 hrs | .67 | 35, 45 |
| Boiled 22 hrs | .32 | 29, 37 |
| Boiled 58 hrs | .13 | 18, 21 |
| Boiled 97.5 hrs. beaten 20 min | .09 | 15, 18 |

The results of Table 5 are visually represented in curve B of Figure 2. This curve shows that good stability is achieved by the use of the ammonia treatment with nitrocellulose containing as high as 3.2 mg. SO₄ per g. of nitrocellulose. As the SO₄ content approaches zero, curves A and B tend to meet, indicating that the effect of the ammonia treatment is to offset the unstability due to presence of the SO₄. Also, apparently the ammonia treatment has no effect on other factors causing unstability.

Again, it is mentioned that the stability obtained by the ammonia treatment is not due, solely at least, to its alkalinity, since tests with other portions of the same samples used in obtaining the data for Table 5, but substituting a sodium hydroxide treatment for the same ammonia treatment, gave no noticeable increase in stability over the samples not so treated.

The manner by which ammonia brings about stabilization of nitrocellulose is indicated in the following experiment using a sample of nitrocellulose (12.82% N), treated only by rinsing, which was then stirred for 15 minutes in a 1% aqueous ammonia solution and washed with distilled water until the washings gave no test with Nessler's reagent. This sample had a stability of 45 minutes with the 110° test, as compared to 2 minutes in the absence of the ammonia treatment. Ten grams of the ammonia-treated sample was repeatedly boiled with 250 ml. of 0.01 normal HCl, and the extracts obtained from each boiling by filtering on washed paper were made up to known volume for determination of sulfate and ammonia contents. Toward the end of the boiling, a beating treatment was introduced. The amounts of sulfate and ammonia removed from the sample by the various extracts are indicated in Table 6, all ammonia values being adjusted by subtraction of the 0.34 mg./g. to compensate for the systematic error before described.

Table 6

| Boiling treatment | Ammonia (NH₃) removed, mg./g. | Sulfate (SO₄) removed, mg./g. |
|---|---|---|
| 1st extract (boiled 14 hrs.) | 1.08 | 4.35 |
| 2d extract (boiled 2 hrs.) | .23 | 1.02 |
| 3d extract (boiled 2 hrs.) | .05 | .30 |
| 4th extract (boiled 2 hrs.) | .00 | .15 |
| 5th extract (boiled 17 hrs.) | .03 | .26 |
| 6th extract (boiled 2 hrs.) | .00 | .07 |
| 7th extract (beaten 5 min.) | .01 | .18 |
| 8th extract (boiled 3 hrs.) | .00 | .10 |
| Total | 1.40 | 6.43 |

The data of Table 6 show that as regards the sample tested, 1.4 mg. of ammonia is sufficient to stabilize 1 g. of freshly prepared nitrocellulose containing 6.43 mg. of sulfate. This gives a ratio of mols of NH₃ to mols of SO₄ of 1.20.

A number of other experiments similar to the one described next above were carried out with other samples, some without and some with the boiling treatment, the results of which are shown in Table 7, the first line being the total line of Table 6, and the other lines being corresponding lines for the other samples, a column for the ratio of mols of NH₃ to mols of SO₄ being added.

Table 7

| Treatment preceding stabilization with 1% ammonia | Total ammonia (NH₃), mg./g. | Total sulfate (SO₄), mg./g. | $\frac{\text{Mol NH}_3}{\text{Mol SO}_4}$ |
|---|---|---|---|
| Rinsed (from Table 6) | 1.40 | 6.43 | 1.20 |
| Rinsed | .72 | 4.64 | .88 |
| Boiled 30 min | .56 | 3.20 | 1.00 |
| Boiled 2 hrs | .37 | 1.40 | 1.49 |

The data of Table 7 show too wide a variation to be taken as establishing an exact relationship between the ammonia consumed in the treatment and the sulfate present in the sample. However, in the tests for determination of ammonia, the ammonia content in the sample will include not only that consumed in neutralizing the unstabilization due to the SO₄, but probably in addition a small amount bound by the nitrocellulose within the fiber structure, held by liquid retained on the treated fiber, or both. It is probable, therefore, that the ratios are higher than the ratios required for neutralization of the SO₄ itself.

If the sulfate is present in the nitrocellulose fiber as half-ester represented by R—SO₄H as has been suggested, 1 mol of NH₃ would combine with 1 mol of SO₄. If, however, the sulfate is present as free acid, as has been suggested also, 2 mols of NH₃ would combine with 1 mol of SO₄. Therefore, the data above favor the half-ester suggestion.

In another experiment, freshly prepared nitrocellulose (12.6% N) was treated with ammonia, rinsed and dried, giving a resulting stability with the 110° test of 18 minutes. Three grams of the stabilized material was then stirred for 10 minutes with 75 ml. of 5 normal HCl, rinsed free from Cl ions, and dried, resulting in a nitrocellulose reduced in stability to 5 minutes, which could not be improved by further rinsing. However, upon a retreatment with ammonia, good stability again obtained.

The evidence at hand as shown by the foregoing experiments indicates that the ammonia treatment offsets the harmful effect of the sulfuric acid bound within the structure or fiber of the nitrocellulose, and that other bases, at least the many tried, are unable to accomplish this result, possibly because of inability to penetrate to the position where the sulfate is fixed.

It may be noted from the experiments that a very small amount of ammonia actually is involved in the stabilization of the nitrocellulose, 1.40 mg. of NH₃ per g. of nitrocellulose being indicated in Table 6. It has been shown that with nitrocellulose which has been boiled for 4 hours and beaten, less than 0.1 mg. per g. is required. These amounts are almost negligible.

In actual production of the stabilized nitrocellulose, the ammonia consumption would include also the small amount bound by the nitrocellulose and any lost by the liquid retained on the fiber when draining the treating solution from the nitrocellulose. The liquid loss involved in this latter amount, without taking special precautions for recovery, may be roughly ten times the weight of the nitrocellulose fiber treated. This would involve a loss of 5 pounds of ammonia per 1,000 pounds of nitrocellulose on the basis of employment of a 0.05% ammonia solution. Under these conditions, the total loss of ammonia would approximate 0.64% of the weight of the fiber treated, and this could be considerably decreased by pressing or centrifuging the treated fiber to recover the retained liquid or by recovery of the ammonia from the water used in washing the retained liquid from the fiber.

Since the ammonia solution drained off the batch of treated nitrocellulose may be reused, if desired, in treating other batches, and since the process is attended with little work and is accomplished in a short time, it may be seen that the invention involves a very simple and inexpensive manner of treatment.

The above examples and experiments were all conducted with laboratory-prepared samples and equipment. In the following example, the nitrocellulose sample was from a batch being prepared for making pyro powder.

EXAMPLE IV 1.5 pounds of nitrocellulose were taken from a boiling tub following two 4-hour periods of boiling with changes of water. The sample was beaten in a laboratory beater to fineness approximating that of finished pyro. It was next boiled for four hours and allowed to settle. The water was decanted, replaced with cold water to which was added aqueous ammonia containing NH₃ amounting to 1 percent of the weight of the nitrocellulose. The suspension was stirred at room temperature for 1 hour, allowed to settle, and washed by decantation with eight changes of water. The product gave stability of 29 minutes by the 134.5° German test and 37 minutes by the 65.5° starch-potassium iodide test (this test is a standard procedure described in War Department Technical Manual TM 9-2900). Similar stable products were produced with 6.5 to 15 hours of boiling.

It is desirable that a certain amount of boiling follow the beating treatment. The beater in this example was a small paper mill type beater. Excellent stability was also produced when ammonia was introduced into the solution during the beating operation. This has the advantage of reducing acidity and hence reducing the corrosion of the beater as well as produing good stability.

Having thus described the invention, what is claimed is:

1. A process comprising stirring nitrocellulose in an aqueous solution containing ammonia at room temperature for a time not to exceed about 1 hour, thereby to stabilize the nitrocellulose.

2. A process comprising stirring nitrocellulose with weak ammonium hydroxide at room temperature for a time not to exceed about 1 hour, thereby to stabilize the nitrocellulose.

RICHARD E. REEVES.
JOEL E. GIDDENS.